May 10, 1966  M. J. DEMO  3,250,337
ROTARY SHOCK WAVE DRILL BIT
Filed Oct. 29, 1963  2 Sheets-Sheet 2
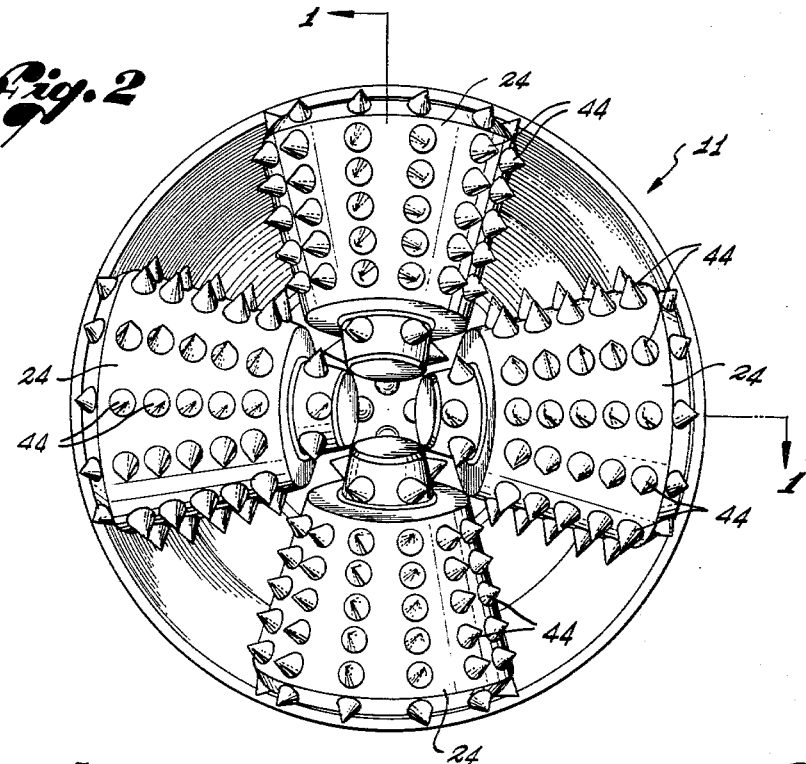
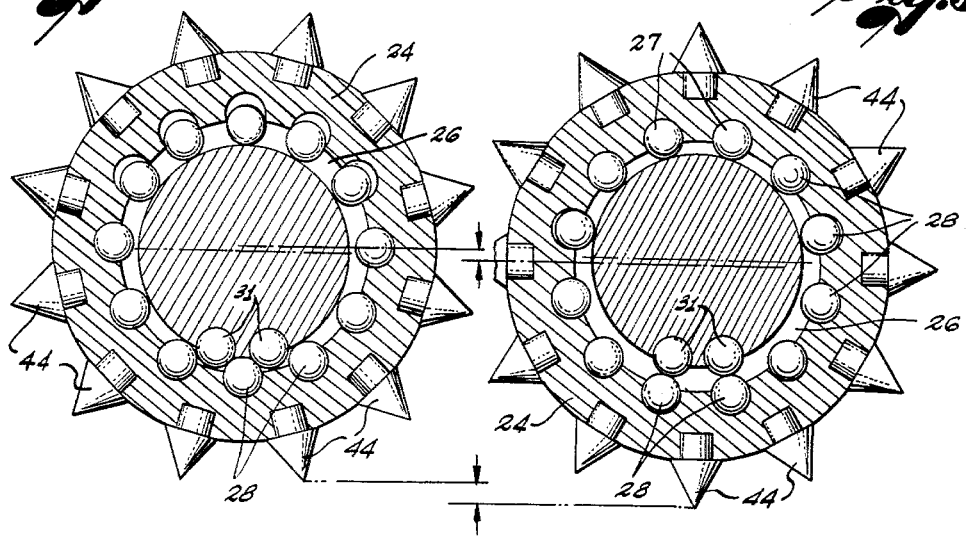
INVENTOR.
Max J. Demo
BY Fulwider, Patton, Rieber,
Lee, and Utecht
ATTORNEYS United States Patent Office 3,250,337
Patented May 10, 1966

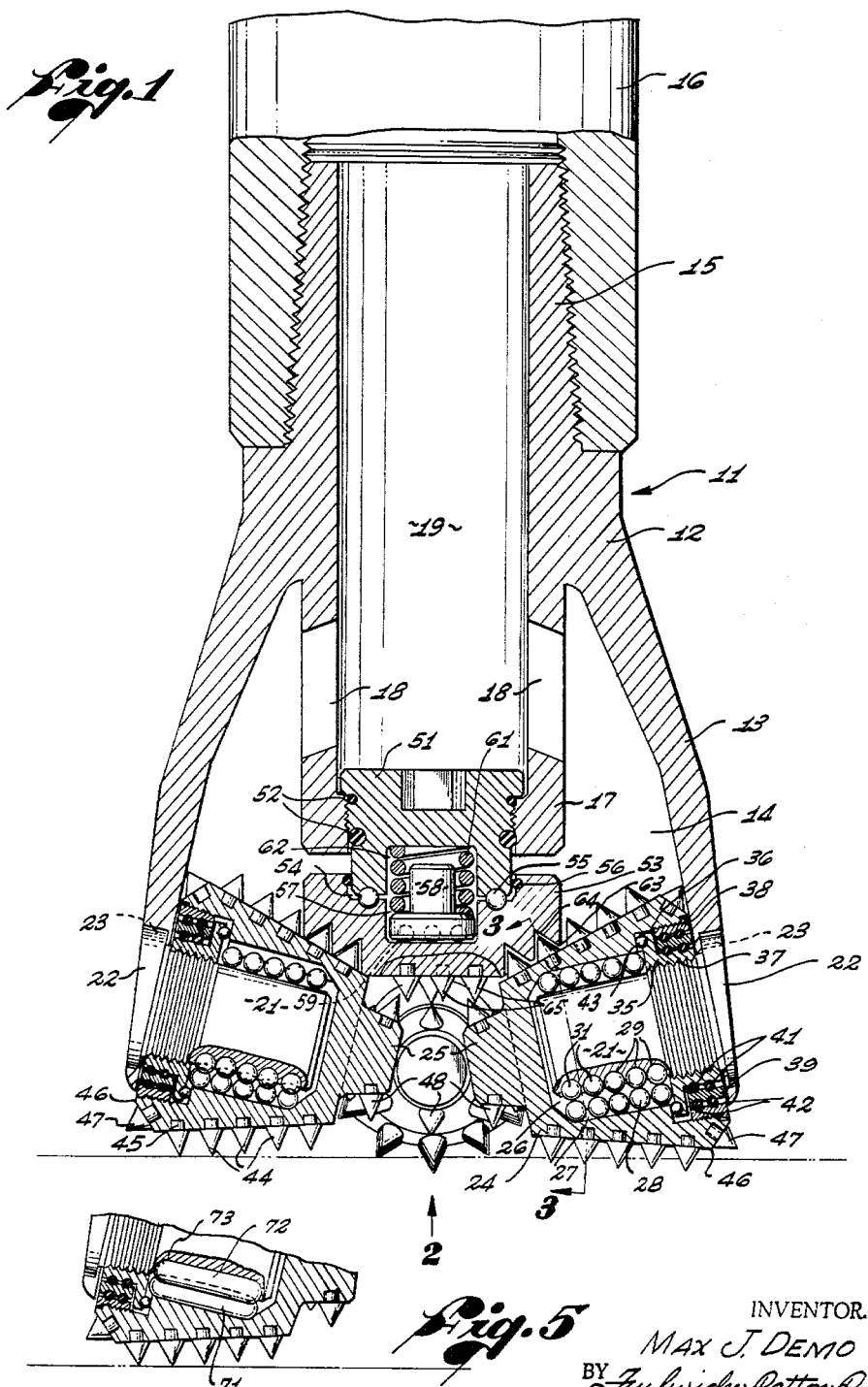

3,250,337
ROTARY SHOCK WAVE DRILL BIT
Max J. Demo, 1118 20th St., Santa Monica, Calif.
Filed Oct. 29, 1963, Ser. No. 319,705
19 Claims. (Cl. 175—343)

The present invention relates generally to vibratory apparatus, and more particularly to a vibrating and impacting rotary drill bit.

In the application of the present invention to drill bits for drilling holes through rock, mineral and masonry structures, such as for wells or other passages through formations of the earth's crust, rotary drill bits are utilized whose cutters are subjected to great stress and wear in drilling through hard rock-like formations. These drill bits must be frequently retracted from the drill hole for inspection, repair and replacement, and in drilling deep holes the operation of pulling out the drill bit and the accompanying disassembly of the drive pipe becomes time consuming and expensive. Also, the drilling rate with present drill bits becomes quite slow when hard rock formations are encountered and the combination of slow drilling rate and down time for removal and insertion of the bit greatly increases the cost of the drilling operation.

According to the present invention, there is provided a drill bit which will not only operate with greater efficiency, to increase the speed of the drilling operation, but which will have a much greater useful operating life so that the down time for withdrawing and replacing the drill bit is greatly decreased. Therefore, and particularly in drilling holes of considerable depth, the cost of the drilling operation and the overall time required are greatly reduced.

The drill bit of the present invention provides rotary cutters which not only cut and tear the drilling surface to advance the hole, but also impart to the surface a plurality of rapid impacts as an incident to the rotation of the bit. These impacts not only force the cutting elements into the drilling surface, but are also believed to set up shock waves which crystallize the rock material beyond the cutting surfaces so that it may more readily be separated from the main body through which the hole is being drilled. The bit has circumferentially spaced cutting members thereon which rotate as an incident to the rotation of the bit. These rotating cutting members have surfaces which move with different speeds relative to the drilling surface so that portions of the rotating members slide relative thereto. The peripheral surfaces of the cutting members are provided with a multiplicity of cutting elements, exemplified in the form of conical cutting tips arranged in rows spaced circumferentially and axially of the cutting members. The cutting members in the specific embodiment illustrated are frusto-conical in shape, with their extended tips offset beyond the axis of rotation of the bit to produce the relative sliding motion.

The rotary cutting members are preferably arranged in diametrically disposed pairs and the cutting members in each pair move in unison to place symmetrical loading on opposite sides of the axis of the drill bit. The cutting elements are rapidly and repeatedly impacted against the drilling surface as an incident to the rotation of the cutting members about their axes. The cutting members rotate as an incident to the rotation of the drilling bit about its axis, by the engagement of the cutting elements with the drilling surface. The cutting elements are forced by these impacts into the drilling surface to effect a cutting operation. Furthermore, the cutting elements are moved through the drilling surface by the sliding component of motion of the cutting members relative to the surface. In addition to forcing the cutting elements into the drilling surface, the repeated impacts set up shock waves which crystallize the surface material beyond the cutting elements and facilitate its separation from the main body through which the drill bit is progressing. All of these operations occur as an incident to the rotation of the drill bit and interact to increase the efficiency and speed of the cutting operation. The cutting members are desirably interconnected to enforce their rotation at the same speed and to maintain their synchronization so that the diametrically opposed pairs will operate in unison in their impacting and withdrawing movements.

It is therefore an object of the present invention to provide an improved rotary drill bit for rock, mineral and masonry structures.

Another object of this invention is the provision of an improved drill bit for rock-like materials operating with increased speed and efficiency and with lessened wear.

Another object of this invention is the provision of an improved drill bit for rock-like materials in which the cutting elements thereof are impacted against the surface being cut, as an incident to the rotation of the cutting elements by the drill bit.

A further object of this invention is the provision of an improved rotary drill bit which employs a relatively large number of vibrating or impacting elements to set up shock waves in the material being cut at a substantially high frequency.

A still further object of this invention is the provision of an improved rotary drill bit having rotary cutting members thereon employing a plurality of peripheral cutting elements which are impacted against the surface being cut and some of which have sliding, non-rotary movement through to the surface material.

Yet another object of this invention is an improved rotary drill bit employing rotary cutting members having cutting elements about their periphery, the cutting members moved bodily in rapid succession toward and away from the surface to impact the cutting elements thereagainst, certain of the cutting elements having sliding, non-rotary movement through the drilling surface to effect a cutting operation.

These and other objects and features of the invention will be readily apparent to those skilled in the art from the following specification and the appended drawings, in which:

FIGURE 1 is a vertical sectional view taken on right-angle, radial planes indicated at 1—1 in FIGURE 2;

FIGURE 2 is a bottom plan view of the drill bit;

FIGURE 3 is a transverse sectional view through a rotary cutting member substantially on the lines 3—3 of FIGURE 1 and showing the cutting member at its lowermost, impacting position;

FIGURE 4 is a view similar to FIGURE 3, but showing the rotary cutting member in its uppermost, withdrawn position; and FIGURE 5 is a partial, longitudinal, sectional view through a rotary cutting member showing a modified impact actuator.

The drill bit embodiment of the present invention selected for illustration and description herein is shown at 11 as having a body member 12 from which depends an outer hood-like housing 13, annular in cross-section and providing an open bottom, interior chamber 14 therein. A threaded, hollow hub 15 extends upwardly from the body portion 12 for connection to the hollow pipe 16 which serves to support and rotate the drill bit 11. The body portion 12 also has an integral, depending, tubular portion 17 extending into the chamber 14 and provided with openings 18 therethrough which communicate the chamber 14 with the passage 19 interiorly of the body portion 12, and thence with the interior of the drive pipe 16 for the passage of drilling fluid to the cutting members and drilling surface.

At positions spaced 90 degrees apart about the circumference of the housing 13 are mounted supporting shafts 21, rigid with the housing and supported by integral heads 22 received in complementary sockets in the housing wall. The heads 22 are held against rotation relative to the housing by keys 23 interlocked with the housing and the heads. Supported on the shafts 21 for rotation about the axes thereof are rotary cutting members 24 of frusto-conical shape and having reduced frusto-conical hubs 25 extending axially therefrom toward the axis of the drill bit. The cutting members 24 have internal cup-shaped recesses 26 therein receiving the shafts 21 and about whose circumferences are disposed a plurality, twelve as illustrated, of ball-receiving, axially-extending slots 27 holding a plurality of actuating balls 28, shown as numbering five in each row.

In the bottom surface of each supporting shaft 21 is mounted a pair of rows of ball holes 29, also shown as five in number, having balls 31 disposed therein so as to be positioned opposite balls 28 in the slots 27. The rows of ball holes 29 are offset to opposite sides of the vertical planes through the axes of the shafts 21, as shown more particularly in FIGURE 3, which offsets should conform to the spacing between the balls 28 so that a pair of rows of balls 28 will be radially aligned with the pair of co-operating rows of balls 31 in the downward, impacting position of the cutting member 24, as shown in FIGURE 3. With the number of balls selected for illustration, the offset is 15 degrees to each side of the vertical plane and the angular spacing between the centers of the balls 28 is 30 degrees.

The distances the balls 28 and 31 extend out of the slots 27 and holes 29, respectively, will determine the amount of movement of the cutting members 24 from their upward, withdrawn position of FIGURE 4 to their downward, impacting position of FIGURE 3. By way of example only, each set of balls may extend substantially one-tenth of an inch beyond the peripheral surface in which it is supported so that the total shifting movements of the rotary members 24 relative to their supporting shafts 21 are substantially one-fifth inch.

The supporting shafts 21 are shown in a desirable angular inclination of substantially 15 degrees with respect to the transverse plane through the drill bit. It will be noted that the frusto-conical surfaces of the cutting members 24 are selected and disposed so that the extended tips of the cones are offset outwardly of the axis of rotation of the drill bit so that the surfaces of the cutting members will have different speeds relative to the drilling surfaces. Thus, some portions of the cutting members will have true rolling movement relative to the drilling surface, while other portions will have a sliding, non-rotating component of motion relative to the surface.

A relatively stationary, annular locking member 35 is provided for each cutting member 24 and is received in an end counter sink 36 in the cutting member. The annular member 35 is threaded at 37 on the associated supporting shaft 21 so as to be stationary relative thereto in the drilling operation. An annular retaining member 38 is threaded into the counter sink 36 in each cutting member 24 and has clearance with respect to the annular member 35 so as to permit the shifting movement of the rotary cutting member 24 transversely relative to its supporting shaft 21. A floating ring 39 is disposed between the annular members 35 and 38 and sealing rings 41 and 42 are arranged in pairs on opposite sides of the floating ring 39 in engagement with the annular members 35 and 38. The rings 41 and 42 seal the interior of the cup-shaped recess 26 against entrance of drilling fluid, while at the same time permitting the shifting movements of the rotating cutting members 24, the sealing rings being compressed at the top and expanding at the bottom in the impacting position of FIGURE 3 and being compressed at the bottom and expanded at the top in the withdrawn position of FIGURE 4.

End thrust bearings for the cutting members 24 may be provided by the end balls 28 bearing against the inner surfaces of the annular members 35 or, alternatively or in addition thereto, end thrust bearing balls 43 may be provided seated in the inner surfaces of the annular members 35 and bearing against the end walls of the counter sinks 36.

The main frusto-conical surfaces of the cutting members 24 are provided with a plurality of cutting elements 44, shown as conical cutting tips supported on stems 45 which are received in complementary sockets in the periphery of the cutting members and contained therein by any desired means such as soldering, welding, brazing or mechanical attachment. The cutting tips 44 are arranged in circumferentially spaced rows extending along the periphery of the cutting members 24, preferably intermediate the rows of balls 28, as shown in FIGURES 3 and 4. Thus, a row of cutting elements 44 will be directed vertically downwardly when the cutting member 44 is in its lowermost, impacting position. Such arrangement is not essential, but is a preferred symmetrical disposition and provides twelve rows of cutting tips. With five tips in each row, there are sixty separate cutting elements or tips on each rotary member 24.

The outer ends of the cutting members 24 are chamfered at 46 to provide surfaces having cutting elements 47 disposed therein to define the outer circumference of the hole being drilled. The inner projecting bosses 25 on the cutting members are provided with cutting elements 48 about their peripheries. The cutting elements or tips 44, 47 and 48 may be formed of any desired hard cutting material of which tungsten carbide is but one example.

In the bottom of the internal tubular extension 17 is threaded a bearing plug 51 having a pair of sealing rings 52 thereabout to protect the threads. A rotatable timer or synchronizing disc 53 has a recess 54 in its upper surface receiving the end of the plug 51, with bearing balls 55 disposed in opposed circular races in the end surface of the plug and the bottom surface of the recess. A sealing ring 56 seals the recess from the drilling fluid. Centrally of the recess 54 is a second smaller and deeper recess 57 in which is disposed a spring idler 58 in whose bottom surface are pocketed bearing balls 59 bearing against the bottom surface of the inner recess 57. A compression spring 61 is disposed between the spring idler 58 and the bottom of a downwardly directed recess 62 in the plug 51.

The bottom edge of the disc 53 is chamfered as at 63 to provide a surface which is substantially tangent to the upper surfaces of the cutting members 24. In the surface 63 are disposed sockets 64 which are complementary to and receive the cutting elements 44 at the internal ends of the cutting members 24. The sprocket action of the cutting elements or tips 44 in the sockets 64 serves to interconnect all four cutting elements 24 by the disc 53 so that the rotations of the cutting members 24 are synchronized and they are maintained in constant relative positions throughout the operation of the bit. These rotations are esablished so that the diametrically-opposite, or 180 degree spaced, cutting members operate in unison as pairs and while one pair of cutting members are in the downward, impacting position of FIGURE 3, the other pair cutting members are in the withdrawn or upward position of FIGURE 4. The downwardly directed face of the disc 53 is desirably provided with cutting elements at 65.

The maximum diameters of the cutting members 24 are preferably selected so that the cutting members rotate substantially twice for one rotation of the drill bit 11.

The operation of the drill bit illustrated as an embodiment of the present invention will now be described. The drill bit 11 is rotated by the drive tube 16 in a well or other drill hole and a drilling fluid may be supplied through the tube 16, passage 19 and openings 18 to the housing 14 from which it is passed by the rotating cutting members 24 to the drilling surface. As the drill bit 11 rotates, the cutting members 24 will be rotated at twice the angular velocity of the bit by their engagement with the drilling surface. The rotations of the cutting members 24 are synchronized by their interlocking with the timer disc 53 through the sprocket action of the inner cutting tips 44 in the sockets 64 in the timer disc. The disc 53 is thereby rotated about the axis of rotation of the drill bit 11 while the cutting members 24 are rotating about the axes of the supporting shafts 21.

Since the projected tips of the main frusto-conical surfaces of the cutting members 24 extend beyond the axis of rotation of the drill bit 11, the cutting elements 44 will not simply roll over the drilling surface, but portions of the cutting elements will also having a sliding, cutting component of motion relative to the surface in addition to the rolling motion thereover. Just which portions of the cutting members have relative rolling motion only, and which the sliding and cutting motion will vary from time to time, but is believed to be more likely to be governed by the major diameter, peripheral portion of the cutting members having substantially true rolling motion while the interior portions of the members have sliding components of movement in addition.

As the cutting members 24 are rotated over the drrilling surface by the rotation of the drill bit 11, the balls 28 disposed about the recess 26 are successively presented to the balls 31 in the lower surface of the supporting shaft 21. When a row of balls 28 lies between the rows of balls 31 as in FIGURE 4, the cutting member 24 in that position will be in its uppermost or withdrawn position. As the cutting member 24 rotates 15 degrees from the position of FIGURE 4, two rows of balls 28 will be radially aligned with the two rows of balls 31 as in FIGURE 3, and the cutting member 24 in that position will be in its foremost or impacting position. In the embodiment illustrated there are twelve rows of balls 28 on each cutting member 24, so that twelve impacts of the cutting members will occur for each revolution thereof. With the locations shown, a row of cutting tips 44 is in a substantially vertical plane intermediate the paired rows of balls 31 when the cutting member 24 is in impacting position.

Since the cutting members 24 have two revolutions for each revolution of the cutting bit 11, there are 24 impacts of each cutting member for each revolution of the bit. Considering now only the cutting elements or tips 44 on the main frusto-conical portion of a cutting member 24, there are twelve rows of cutting elements with five in each row, or a total of sixty main cutting elements 44 on each cutting member. Since each cutting member effects twenty-four impacts per rotation of the bit, the four of them illustrated will effect ninety-six impact aggregate, and since each cutting member impact is effected to the surface being cut through the cutting elements or tips, there are 96×60 or 5,760 cutting tip impacts effected from each revolution of the drill bit. When it is then considered that the drill bit may be rotated at speeds, for example, of 100 r.p.m., this results in 576,000 cutting tip impacts per minute to set up shock wave action and operation of the drill bit of this invention.

Now considering that each cutting member 24 impacts 24 times for each bit revolution, this means a frequency of 2400 cutting member impact for each pair of opposed cutting members for each 100 revolutions of the drill bit. Since there are two 90 degree offset pairs of cutting members, the total impact frequency of the cutting members themselves is 48 per bit revolution or 4800 per minute on a basis of 100 r.p.m. for the bit.

The shock waves produced by these impacts are believed to effect crystallization of the material being drilled beyond its actual surface engagement with the cutting elements or tips, this increasing the speed and effectiveness of the cutting operation. The crystallized material is chipped or cut out of the drilling surface more easily than the original material and the drilling operation is conducted with greater speed and less wear on the cutting elements.

It is therefore seen that the drilling tool embodiment of the present invention operates by the direct impact cutting or chiseling of the cutting tips 44, by their sliding and cutting action relative to the drilling surface, but also by means of the vibratory shock waves set up by the frequent multiple impacts which crystallize the material being drilled beyond the actual engagement thereof with the cutting elements so as to facilitate the separation of the crystallized material from the main body being drilled.

As the cutting members 24 rotate, they are held in synchronized movements by the timer or synchronzing disc 53 in which the inner cutting elements 44 engage the sockets 64 in a sprocket-like action. The timing disc 53 is shown in FIGURE 1 in its uppermost position, having been moved thereto by the cutting member 24 shown at the left of the figure which is in its withdrawn or uppermost position. In the operation of the bit, the disc 53 will reciprocate between this uppermost position and a lower position corresponding to the intermediate position of the cutting members 24 which will be approximately half the full movement of the cutting members. The timer disc 53 follows up the movements of the cutting members since it is biased downwardly by the spring 61 and is free to rotate relative to the spring by its ball engagement with the spring follower or idler 58.

The rotation of the cutting members 24 also effects internal cutting by the cutting elements 48, and if any central core material remains, it will be chewed up by the cutting elements 65 which rotate with the disc 53. The cutting elements 47 also rotate with the cutting members 24 to cut the cylindrical surface of the drill hole. The cutting elements 47 are also subjected to the vibratory impact action previously described and will crystallize the drilled material beyond the point of the tip engagement so as to provide clearance of the bit in the drill hole.

FIGURE 5 shows a slightly modified arrangement in which the rows of balls 28 and 31 have substituted therefor elongated rollers 71 and 72, respectively. To accommodate the rollers 72, the ball sockets 29 are replaced by an elongated slot 73. The operation of the drill bit employing the roller construction of FIGURE 5 is identical with that employing the ball construction of FIGURE 1.

While certain preferred embodiments of the invention have been specifically illustrated and described, it will be understood that the invention is not limited thereto as many variations will be apparent to those skilled in the art, and the invention is to be given its broadest interpretation within the terms of the following claims.

I claim:

1. A drill bit comprising: a support having an axis about which it is adapted to be rotated; a plurality of supporting shafts mounted on said support in positions generally transverse to and circumferentially spaced about said axis of rotation; a cutting member mounted for rotation on each of said supporting shafts; a plurality of cutting elements disposed about the periphery of each cutting member to be successively engageable with the drilling surface; a plurality of rolling members mounted in circumferentially spaced relation within said cutting members about said supporting shafts; and rolling members mounted in the lower portions of said shafts in positions to engage the rolling members on said cutting members successively as said cutting members rotate on said shafts, the engagement of said rolling members forcing said cutting members to shift transversely of said shafts to downward impact positions, whereby rotation of said cutting members is accompanied by rapid shifting movements thereof to effect multiple rapid impact of the cutting elements against the drilling surface.

2. A drill bit comprising: a support having an axis about which it is adapted to be rotated; a plurality of supporting shafts mounted on said support in positions generally transverse to and circumferentially spaced about said axis of rotation; a cutting member mounted for rotation on each of said supporting shafts; a plurality of cutting elements disposed about the periphery of each cutting member to be successively engageable with the drilling surface; a plurality of rolling members mounted in circumferentially spaced relation within said cutting members and exposed to and disposed about said supporting shafts; rolling members mounted in the lower portions of said shafts in positions to engage the rolling members on said cutting members successively as said cutting members rotate on said shifts, the engagement of said rolling members forcing said cutting members to shift transversely of said shafts to downward impact positions whereby rotation of said bit is accompanied by rapid shifting movements of the cutting members to effect multiple rapid impacts of the cutting elements with the drilling surface; and means interconnecting said cutting members to insure their rotation in synchronism as an incident to rotation of the drill bit support.

3. A drill bit comprising: a support having an axis about which it is adapted to be rotated; a plurality of supporting shafts mounted on said support in positions generally transverse to and circumferentially spaced about said axis of rotation; a cutting member mounted for rotation on each of said supporting shafts; cutting elements mounted on the peripheries of said cutting members; a plurality of rolling members mounted in circumferentially spaced relation within said cutting members and exposed to and disposed about said supporting shafts; rolling members mounted in the lower portions of said shafts in positions to engage the rolling members on said cutting members successively as said cutting members rotate, the engagement of said rolling members forcing said cutting members to shift transversely of said shafts to downward impact positions whereby rotation of the bit is accompanied by rapid shifting movements of the cutting members to effect multiple rapid impacts of the cutting elements with the drilling surface; rotary synchronizing means; and means on said cutting members engaging said rotary synchronizing means in sprocket-like relation to effect synchronizing of the cutting member rotation.

4. A drill bit comprising: a support having an axis about which it is adapted to be rotated; a plurality of supporting shafts mounted on said support in positions generally transverse to and circumferentially spaced about said axis of rotation; a cutting member mounted for rotation on each of said supporting shafts; a plurality of cutting elements disposed about the periphery of each cutting member to be successively engageable with the drilling surface; a plurality of rolling members mounted in circumferentially spaced relation within said cutting members about said supporting shafts; rolling members mounted in the lower portions of said shafts in positions to engage the rolling members on said cutting members successively as said cutting members rotate on said shafts; the engagement of said rolling members forcing said cutting members to shift transversely of said shafts to downward impact positions, whereby rotation of said cutting members is accompanied by rapid shifting movements thereof to effect multiple rapid impacts of the cutting elements against the drilling surface; and means interconnecting said cutting members for synchronized rotation thereof as an incident to rotation of the bit and with diametrically opposite pairs of cutting members operating in unison to effect the impacting operation.

5. The drill bit defined in claim 4 in which the cutting members are arranged in two diametrically opposed pairs disposed ninety degrees apart and synchronized so that when one pair are in their downward, impacting position, the intermediate pair will be in their upward, withdrawn position.

6. A drill bit comprising: a support having an axis about which it is adapted to be rotated; a plurality of supporting shafts mounted on said support in positions generally transverse to and circumferentially spaced about said axis of rotation; a cutting member mounted for rotation on each of said supporting shafts; cutting elements disposed about the peripheries of said cutting members; a plurality of rolling members mounted in circumferentially spaced relation within said cutting members about said supporting shafts; and rolling members mounted in the lower portions of said shafts in positions to engage the rolling members on said cutting members successively as the cutting members rotate, the engagement of said rolling members forcing said cutting members to shift transversely of said shafts to downward impact positions whereby rotation of the bit is accompanied by rapid shifting movements of the cutting members to effect multiple rapid impacts of the cutting elements with the drilling surface, said impacts producing shock waves at a frequency to crystallize the material of the drilling surface beyond the surfaces of engagement of the cutting elements therewith.

7. A drill bit comprising: a support having an axis about which it is adapted to be rotated; a plurality of supporting shafts mounted on said support in positions circumferentially spaced about said axis of rotation, the axes of said shafts being inclined upwardly from the normal to said axis of rotation, outwardly thereof; a frusto-conical cutting member having a bore therein disposed about each of said supporting shafts so as to be rotatable thereon, said members being disposed with their shorter diameters directed towards said axis of rotation of the support; cutting tips disposed about the peripheries of said cutting members to be successively engaged with the drilling surface as the support is rotated about its axis and the cutting members rotate about said supporting shafts as an incident thereto; a plurality of rolling members mounted in circumferentially spaced relation within said bores; and rolling members mounted in the lower portions of said supporting shafts in positions to engage the rolling members on said cutting members successively as said cutting members rotate, the engagement of said rolling members forcing said cutting members to shift transversely of said shafts to downward impact positions, whereby rotation of the bit is accompanied by rapid shifting movement of the cutting members to effect multiple rapid impacts of the cutting tips with the drilling surface.

8. The drill bit defined in claim 7 in which said cutting tips are arranged axially extending, circumferentially spaced rows about the peripheries of said cutting members and in which the rows of cutting tips are disposed with respect to the rolling members in said cutting members so that a row of cutting tips will be directed substantially downwardly when the cutting member on which they are supported is in its downward, impacting position.

9. A drill bit comprising: a support having an axis about which it is adapted to be rotated; a plurality of supporting shafts mounted on said support in positions circumferentially spaced about said axis of rotation, the axes of said shafts being inclined upwardly from the normal to said axis of rotation, outwardly thereof; a frusto-conical cutting member having a bore therein disposed about each of said supporting shafts so as to be rotatable thereon, said members being disposed with their smaller ends directed towards, and their projected tips located beyond, said axis of rotation of the support; cutting tips disposed about the peripheries of said cutting members to be successively engaged with the drilling surface as the support is rotated about its axis and the cutting members rotate about their supporting shafts as an incident thereto; a plurality of rolling members mounted in circumferentially spaced relation within said bores; rolling members mounted in the lower portions of said supporting shafts in positions to engage the rolling members on said cutting members successively as said cutting members rotate, the engagement of said rolling members forcing said cutting members to shift transversely of said shafts to downward impact positions whereby rotation of said cutting members is accompanied by rapid shifting movements thereof to effect multiple rapid impacts of the cutting tips with the drilling surface; and means interconnecting said cutting members to maintain their rotations about said supporting shafts synchronous to control the sequence of their impacting movements and the shock waves produced thereby in the drilling surface.

10. A drill bit comprising: a support having an axis about which it is adapted to be rotated; a plurality of supporting shafts mounted on said support in positions circumferentially spaced about said axis of rotation, the axes of said shafts being inclined upwardly from the normal to said axis of rotation, outwardly thereof; a frusto-conical cutting member having a bore therein disposed about each of said supporting shafts so as to be rotatable thereon, said members being disposed with their smaller ends directed towards, and their projected tips located beyond, said axis of rotation of the support; a plurality of cutting tips disposed about the peripheries of said cutting members to be successively engaged with the drilling surface as the support is rotated about its axis and the cutting members rotate about their supporting shafts as an incident thereto; a plurality of rolling members mounted in circumferentially spaced relation within said bores; rolling members mounted in the lower portions of said supporting shafts in positions to engage the rolling members on said cutting members successively as said cutting members rotate, the engagement of said rolling members forcing said cutting members to shift transversely of said shafts to downward impact positions, whereby rotation of said cutting members is accompanied by rapid shifting movements thereof to effect multiple rapid impacts of the cutting tips with the drilling surface; a timer disc mounted for rotation about said support axis and disposed immediately above said cutting members; and sockets in said timer disc receiving the inner cutting tips on said cutting members in sprocket-like relation to enforce synchronous rotation of said cutting members.

11. A drill bit comprising: a support having an axis about which it is adapted to be rotated; a plurality of supporting shafts mounted on said support in positions circumferentially spaced about said axis of rotation, the axes of said shafts being inclined upwardly from the normal to said axis of rotation, outwardly thereof; a frusto-conical cutting member having a bore therein disposed about each of said supporting shafts so as to be rotatable thereon, said members being disposed with their smaller ends directed towards, and their projected tips located beyond, said axis of rotation of the support; a plurality of cutting tips disposed about the peripheries of said cutting members to be successively engaged with the drilling surface as the support is rotated about its axis and the cutting members rotated about their supporting shafts as an incident thereto; a plurality of rolling members mounted in circumferentially spaced relation within said bores; rolling members mounted in the lower portions of said supporting shafts in positions to engage the rolling members on said cutting members successively as said cutting members rotate, the engagement of said rolling members forcing said cutting members to shift transversely of said shafts to downward impact positions, whereby rotation of said cutting members is accompanied by rapid shifting movements thereof to effect multiple rapid impacts of the cutting tips with the drilling surface; a timer disc mounted for rotation about said support axis and disposed immediately above said cutting members; and sockets in said timer disc receiving the inner cutting tips on said cutting members in sprocket-like relation to enforce synchronous rotation of said cutting members, said timer disc sockets interlocking with said cutting tips so that diametrically opposite cutting members move in unison as well as in synchronism as to have common impacting and withdrawing motions.

12. The drill bit defined in claim 11 in which said cutting members are four in number arranged with diametrically opposite members paired, the pairs being circumferentially spaced ninety degrees apart, and in which the pairs are arranged in directly opposed shifting phase so that one pair is in downward, impacting position while the other pair is in upward, withdrawn postion.

13. A drill bit comprising: a support having an axis about which it is adapted to be rotated; a plurality of supporting shafts mounted on said support in positions generally transverse to and circumferentially spaced about said axis of rotation; a cutting member with a bore therein supported on each of said supporting shafts for rotation thereon; a plurality of cutting tips mounted in rows spaced circumferentially about said cutting members; a plurality of rolling members mounted in circumferentially spaced relation within the bores in said cutting members, said rolling members being located radially intermediate said rows of cutting tips; and a pair of rolling means mounted on the lower surface of each shaft spaced apart equidistant from the vertical plane therethrough and angularly spaced at the same distance as the angular spacing between the rolling members in said cutting member bores, said rolling members engaging said paired rolling means successively as said cutting members are rotated to force said cutting members to shift transversely of their supporting shafts to downward impacting positions, the lowermost of said cutting tips being directed substantially downwardly when the cutting member is in its position of maximum downward shift.

14. A drill bit comprising: a support having an axis about which it is adapted to be rotated; a plurality of supporting shafts mounted on said support in positions generally transverse to and circumferentially spaced about said axis of rotation; a cutting member with a bore therein supported on each of said supporting shafts for rotation thereon; a plurality of cutting tips mounted in rows spaced circumferentially about said cutting members; a plurality of rolling members mounted in circumferentially spaced relation within the bores of said cutting members, said rolling members being located radially intermediate the said rows of cutting tips; a pair of rolling means mounted in the lower surface of each shaft spaced apart equidistant from the vertical plane therethrough and angularly spaced at the same distance as the angular spacing between the rolling members in said cutting member bores, said rolling members engaging said paired rolling means successively as said cutting members are rotated to force said cutting members to shift transversely of their supporting shafts to downward impacting positions, the lowermost of said cutting tips being directed substantially downwardly when the cutting members are in their positions of maximum downward shift; and means interconnecting said cutting members to insure synchronous rotation thereof as an incident to the rotation of the drill bit support to control the shock waves set up in the drilling surface by the impact of the cutting tips therein.

15. A drill bit comprising: a support having an axis about which it is adapted to be rotated; a plurality of supporting shafts mounted on said support in positions generally transverse to and circumferentially spaced about said axis of rotation; the axes of said shafts being inclined upwardly from the normal to said axis of rotation, outwardly thereof; a frusto-conical cutting member having a bore therein disposed about each of said supporting shafts so as to be rotatable thereon, said members being disposed with their smaller ends directed towards, and their projected tips located beyond, the said axis of rotation of the support; said shafts and cutting members being located diametrically opposed in pairs; a plurality of substantially conical cutting tips mounted in axially extending, circumferentially spaced rows about the periphery of said cutting members so that the rows are successively engageable with the drilling surface as the cutting members rotate as an incident to the rotation of the drill bit support; rolling members mounted in circumferentially spaced relation within said cutting member bores; rolling means mounted in the lower portions of said supporting shafts to be engaged by said rolling members as said cutting members rotate, the engagement of said rolling members and rolling means forcing said cutting members to shift transversely of their supporting shafts to downward impact positions whereby rotation of said bit support is accompanied by rapid shifting movements of the cutting members to effect multiple rapid impacts of said conical cutting tips with the drilling surface; and additional cutting tips mounted at the outside edges of said cutting members and having outwardly projecting components serving to cut the outer circumference of the drill hole.

16. The drill bit defined in claim 15 in which said cutting members have smaller diameter bosses projecting inwardly from their smaller ends; and additional cutting tips on said bosses.

17. The drill bit defined in claim 16 including a rotary timer disc disposed above and engageable with said cutting elements to enforce synchronous rotation thereof; and additional cutting tips mounted on the downward face of said timer disc adjacent the axis of the support.

18. A drill bit comprising: a support having an axis about which it is adapted to be rotated; a plurality of supporting shafts mounted on said support in positions generally transverse to and circumferentially spaced about said axis of rotation; a cutting member with a bore therein supported on each of said supporting shafts for rotation thereon; a plurality of cutting tips mounted in rows spaced circumferentially about said cutting members; a plurality of rolling members mounted in circumferentially spaced relation within the bores in said cutting members, said rolling members being located radially intermediate said rows of cutting tips; and a pair of rolling means mounted on the lower surface of each shaft spaced apart equidistant from the vertical plane therethrough and angularly spaced at the same distance as the angular spacing between the rolling members in said cutting member bores, said rolling members engaging said paired rolling means successively as said cutting members are rotated to force said cutting members to shift transversely of their supporting shafts to downward impacting positions, the lowermost of said cutting tips being directed substantially downwardly when the cutting member is in its position of maximum downward shift, said rolling members being comprised of rows of balls embedded in the surfaces of said bores and presenting minor portions of their radii above said surfaces, and said rolling means being comprised by rows of balls embedded in said shafts with minor portions of their radii extending beyond the shaft surfaces.

19. A drill bit comprising: a support having an axis about which it is adapted to be rotated; a plurality of supporting shafts mounted on said support in positions generally transverse to and circumferentially spaced about said axis of rotation; a cutting member with a bore therein supported on each of said supporting shafts for rotation thereon; a plurality of cutting tips mounted in rows spaced circumferentially about said cutting members; a plurality of rolling members mounted in circumferentially spaced relation within the bores in said cutting members, said rolling members being located radially intermediate said rows of cutting tips; and a pair of rolling means mounted on the lower surface of each shaft spaced apart equidistant from the vertical plane therethrough and angularly spaced at the same distance as the angular spacing between the rolling members in said cutting member bores, said rolling members engaging said paired rolling means successively as said cutting members are rotated to force said cutting members to shift transversely of their supporting shafts to downward impacting positions, the lowermost of said cutting tips being directed substantially downward when the cutting member is in its position of maximum downward shift, said rolling members being embodied in elongated rollers embedded in the surfaces of the bores with their axes parallel to the axes of rotation of said cutting members, and said rolling means being embodied in elongated rollers embedded in the surfaces of said supporting shafts with their axes parallel to the axes of said shafts, said rollers extending beyond the surfaces of the respective members in which they are supported and the extending portions engaging and disengaging to effect the shifting movements of the cutting members.

References Cited by the Examiner

UNITED STATES PATENTS

| | | | |
|---|---|---|---|
| 1,854,623 | 5/1932 | Powell | 175—311 X |
| 2,020,625 | 11/1935 | Thaheld | 175—343 |
| 2,329,751 | 9/1943 | Fermier | 175—372 X |
| 2,470,695 | 5/1949 | Goodwin et al. | 175—372 X |
| 2,639,896 | 5/1953 | Francis | 175—372 X |
| 3,130,801 | 4/1964 | Schumacher | 175—374 |

CHARLES E. O'CONNELL, *Primary Examiner.*

R. E. FAVREAU, *Assistant Examiner.*